(12) United States Patent
Birnkrant et al.

(10) Patent No.: US 12,339,021 B2
(45) Date of Patent: Jun. 24, 2025

(54) METHOD FOR INCREASING EQUIPMENT EFFECTIVENESS FOR HEALTHY BUILDINGS

(71) Applicant: Carrier Corporation, Palm Beach Gardens, FL (US)

(72) Inventors: Michael J. Birnkrant, Manlius, NY (US); Peter McKinney, Boulder, CO (US); Terence Vanecek, Surf City, NC (US); Simon Walls, Batavia, IL (US); Daniel Love, Syracuse, NY (US); Sarath Chandra, East Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 217 days.

(21) Appl. No.: 18/156,727

(22) Filed: Jan. 19, 2023

(65) Prior Publication Data

US 2023/0228440 A1    Jul. 20, 2023

Related U.S. Application Data

(60) Provisional application No. 63/300,871, filed on Jan. 19, 2022.

(51) Int. Cl.
*F24F 11/49* (2018.01)
*F24F 1/0071* (2019.01)
(Continued)

(52) U.S. Cl.
CPC .......... *F24F 11/523* (2018.01); *F24F 1/0071* (2019.02); *F24F 11/49* (2018.01);
(Continued)

(58) Field of Classification Search
CPC ........ F24F 11/49; F24F 11/522; F24F 11/523; F24F 11/58; F24F 11/63; F24F 11/65; F24F 11/80
See application file for complete search history.

(56) References Cited

U.S. PATENT DOCUMENTS

| 6,917,372 B1 | 7/2005 | Yokoyama |
| 7,383,158 B2 | 6/2008 | Krocker et al. |

(Continued)

FOREIGN PATENT DOCUMENTS

| CN | 110553319 A | 12/2019 |
| CN | 111078240 A | 4/2020 |

(Continued)

OTHER PUBLICATIONS

European Search Report for Application No. 23152523.9; Issued May 23, 2023; 10 Pages.

*Primary Examiner* — Jonathan Bradford
(74) *Attorney, Agent, or Firm* — CANTOR COLBURN LLP

(57) ABSTRACT

A method for monitoring and controlling an environment of an internal space including: providing conditioned air to the internal space using a heating, ventilation, and air conditioning (HVAC) system; detecting one or more environmental parameters within the internal space using at least one sensor; receiving a report request from an individual through a computer application of a computing device, the report request includes a focus area selection that selects one or more focus areas, wherein the one or more focus areas include at least one of an indoor air quality, a thermal comfort, or an airborne transmission; generating a performance report for the focus area based on at least the environmental parameters and specifications of the HVAC system, the performance report evaluating at least a perfor-
(Continued)

mance of the HVAC system; and displaying the performance report on the computing device.

17 Claims, 3 Drawing Sheets

(51) Int. Cl.
*F24F 11/52* (2018.01)
*F24F 11/523* (2018.01)
*F24F 11/58* (2018.01)
*F24F 11/63* (2018.01)
*F24F 11/65* (2018.01)
*F24F 11/80* (2018.01)

(52) U.S. Cl.
CPC .............. *F24F 11/52* (2018.01); *F24F 11/58* (2018.01); *F24F 11/63* (2018.01); *F24F 11/65* (2018.01); *F24F 11/80* (2018.01)

(56) References Cited

U.S. PATENT DOCUMENTS

| | | |
|---|---|---|
| 8,490,006 B1 | 7/2013 | Reeser et al. |
| 9,021,462 B2 | 4/2015 | Gupta |
| 9,310,403 B2 | 4/2016 | Brackney et al. |
| 9,778,639 B2 | 10/2017 | Boettcher et al. |
| 10,126,009 B2 | 11/2018 | Flaherty et al. |
| 10,156,835 B2 | 12/2018 | Bobker et al. |
| 10,225,369 B2 | 3/2019 | Zavesky et al. |
| 10,248,091 B2 | 4/2019 | Viswanath et al. |
| 10,295,964 B2 | 5/2019 | Ray et al. |
| 10,353,359 B1 | 7/2019 | Jordan, II et al. |
| 10,393,394 B2 | 8/2019 | Anandhakrishnan |
| 10,401,810 B2 | 9/2019 | Guthrie et al. |
| 10,429,808 B2 | 10/2019 | Sanghamitra |
| 10,458,668 B2 | 10/2019 | Emmons et al. |
| 10,610,818 B2 | 4/2020 | Fox et al. |
| 10,767,879 B1 | 9/2020 | Burnett |
| 10,895,857 B2 | 1/2021 | Dibowski et al. |
| 10,914,483 B2 | 2/2021 | Kim et al. |
| 10,996,641 B2 | 5/2021 | Yan et al. |
| 11,009,246 B2 | 5/2021 | Song et al. |
| 11,042,128 B2 | 6/2021 | Mishra et al. |
| 11,042,924 B2 | 6/2021 | Asmus et al. |
| 11,049,055 B2 | 6/2021 | Voit et al. |
| 11,079,731 B2 | 8/2021 | Khurana et al. |
| 11,087,192 B2 | 8/2021 | Amisar |
| 11,087,417 B2 | 8/2021 | Bentz et al. |
| 11,131,473 B2 | 9/2021 | Risbeck et al. |
| 11,168,915 B2 | 11/2021 | Zeifman et al. |
| 2005/0149232 A1 | 7/2005 | Shah et al. |
| 2008/0082183 A1 | 4/2008 | Judge |
| 2015/0198938 A1 | 7/2015 | Steele et al. |
| 2016/0266594 A1 | 9/2016 | Kauffman et al. |
| 2017/0269617 A1* | 9/2017 | Daoud ................. G05B 19/048 |
| 2019/0195525 A1 | 6/2019 | Varghese et al. |
| 2020/0003447 A1 | 1/2020 | Lee et al. |
| 2020/0141604 A1 | 5/2020 | Chen et al. |
| 2020/0285206 A1 | 9/2020 | Young et al. |
| 2021/0011444 A1 | 1/2021 | Risbeck et al. |
| 2021/0072742 A1 | 3/2021 | Wu et al. |
| 2021/0165926 A1 | 6/2021 | Flaherty et al. |
| 2021/0191348 A1 | 6/2021 | Lee et al. |
| 2022/0010996 A1 | 1/2022 | Carrieri |
| 2022/0011001 A1 | 1/2022 | Khurana et al. |

FOREIGN PATENT DOCUMENTS

| | | |
|---|---|---|
| CN | 112015098 A | 12/2020 |
| WO | 2019063079 A1 | 4/2019 |
| WO | 2020109963 A1 | 6/2020 |
| WO | 2021010505 A1 | 1/2021 |

* cited by examiner

METHOD FOR INCREASING EQUIPMENT EFFECTIVENESS FOR HEALTHY BUILDINGS

CROSS-REFERENCE TO RELATED APPLICATIONS

This application claims the benefit of U.S. Provisional Application No. 63/300,871 filed Jan. 19, 2022, all of which are incorporated herein by reference in their entirety.

BACKGROUND

The embodiments herein generally relate to a heating, ventilation, and air conditioning (HVAC) system and more specifically to method and apparatus for increasing the effectiveness of the HVAC system.

Sustainable healthy buildings should reduce business impact on occupants by increasing HVAC equipment effectiveness to indoor pollutants and thermal comfort. Conventional HVAC systems are not well equipped to monitor both indoor pollutants and thermal comfort of an evolving space, for example, that might have varying levels of occupancy. Often times, these conventional HVAC systems lack any capability for real-time monitoring of the space to ensure that the indoor pollutants and thermal comfort are being met by the HVAC system. This poses an issue for building owners and/or managers, as without knowing that there is a deficiency in the HVAC system for meeting the needs of the space, necessary upgrades to the HVAC system are often not completed.

BRIEF SUMMARY

According to one embodiment, a method for monitoring and controlling an environment of an internal space is provided. The method including: providing conditioned air to the internal space using a heating, ventilation, and air conditioning (HVAC) system; detecting one or more environmental parameters within the internal space using at least one sensor; receiving a report request from an individual through a computer application of a computing device, the report request includes a focus area selection that selects one or more focus areas, wherein the one or more focus areas include at least one of an indoor air quality, a thermal comfort, or an airborne transmission; generating a performance report for the focus area based on at least the environmental parameters and specifications of the HVAC system, the performance report evaluating at least a performance of the HVAC system; and displaying the performance report on the computing device.

In addition to one or more of the features described above, or as an alternative, further embodiments may include cleaning air within the internal space using one or more portable air-cleaners, wherein the performance report evaluates at least a performance of the HVAC system and a performance of the one or more portable air-cleaners.

In addition to one or more of the features described above, or as an alternative, further embodiments may include disinfecting air within the internal space using one or more disinfection and purification devices, wherein the performance report evaluates at least a performance of the HVAC system and a performance of the one or more disinfection and purification devices.

In addition to one or more of the features described above, or as an alternative, further embodiments may include that generating the performance report for the focus area further includes: determining a performance score for each of the one or more focus areas based on at least the environmental parameters and the specifications of the HVAC system; comparing the performance score to a threshold performance score; and adjusting the HVAC system if the performance score is below the threshold performance score.

In addition to one or more of the features described above, or as an alternative, further embodiments may include that adjusting the HVAC system includes: increasing outdoor air flow into the internal space through an external vent.

In addition to one or more of the features described above, or as an alternative, further embodiments may include that adjusting the HVAC system includes: increasing a detection frequency of the at least one sensor.

In addition to one or more of the features described above, or as an alternative, further embodiments may include that adjusting the HVAC system includes: activating or adjusting portable air-cleaners.

In addition to one or more of the features described above, or as an alternative, further embodiments may include that adjusting the HVAC system includes: activating or adjusting disinfection and purification devices.

In addition to one or more of the features described above, or as an alternative, further embodiments may include that adjusting the HVAC system includes: adjusting or changing a filter of the HVAC system.

In addition to one or more of the features described above, or as an alternative, further embodiments may include that adjusting the HVAC system includes: adjusting or activating a damper of the HVAC system.

In addition to one or more of the features described above, or as an alternative, further embodiments may include that adjusting the HVAC system includes: adjusting or activating a biological management device of the HVAC system.

In addition to one or more of the features described above, or as an alternative, further embodiments may include that adjusting the HVAC system includes: adjusting or activating an odor and chemical pollution management device of the HVAC system.

In addition to one or more of the features described above, or as an alternative, further embodiments may include that generating the performance report for the focus area further includes: determining a performance score for each of the one or more focus areas based on at least the environmental parameters and the specifications of the HVAC system; comparing the performance score to a threshold performance score; and transmitting instructions to the individual via the computer application to perform a maintenance action if the performance score is below the threshold performance score.

In addition to one or more of the features described above, or as an alternative, further embodiments may include that generating the performance report for the focus area further includes: determining a performance score for indoor air quality based on at least the environmental parameters and the specifications of the HVAC system, wherein the environmental parameters include at least one of carbon dioxide concentration ($CO_2$), volatile organic compounds (VOC), particulate matter, and outside air flow level, and wherein the specifications of the HVAC system include at least one of a type of outdoor air and return air filters, filter maintenance and management details, portable air-cleaner details, air cleaning technology, disinfection and purification devices, and maintenance practices for the HVAC system and associated components.

In addition to one or more of the features described above, or as an alternative, further embodiments may include that generating a performance report for the focus area further includes: determining a performance score for thermal comfort based on at least the environmental parameters and the specifications of the HVAC system, wherein the environmental parameters include at least one of average temperature, relative humidity, and temperature control, and wherein the specifications of the HVAC system include at least one of a number of thermostats per zone, a temperature control, and a temperature and humidity monitoring and displays.

In addition to one or more of the features described above, or as an alternative, further embodiments may include that generating the performance report for the focus area further includes: determining a performance score for airborne transmission based on at least the environmental parameters and the specifications of the HVAC system, wherein the environmental parameters include at least one of a room occupancy, a building occupancy, and air change rate in the internal space, and wherein the specifications of the HVAC system include at least one of a room size, a room usage, a building size, and a building usage.

According to another embodiment, an environmental monitoring and control system for monitoring and controlling an environment of an internal space is provided. The environmental monitoring and control system including: a processor; and a memory including computer-executable instructions that, when executed by the processor, cause the processor to perform operations, the operations including: providing conditioned air to the internal space using a heating, ventilation, and air conditioning (HVAC) system; detecting one or more environmental parameters within the internal space using at least one sensor; receiving a report request from an individual through a computer application of a computing device, the report request focus area selection that selects one or more focus areas, wherein the one or more focus areas include at least one of an indoor air quality, a thermal comfort, or an airborne transmission; generating a performance report for the focus area based on at least the environmental parameters and specifications of the HVAC system, the performance report evaluating at least a performance of the HVAC system; and displaying the performance report on the computing device.

According to another embodiment, a computer program product tangibly embodied on a non-transitory computer readable medium is provided. The computer program product including instructions that, when executed by a processor, cause the processor to perform operations including: providing conditioned air to the internal space using a heating, ventilation, and air conditioning (HVAC) system; detecting one or more environmental parameters within the internal space using at least one sensor; receiving a report request from an individual through a computer application of a computing device, the report request focus area selection that selects one or more focus areas, wherein the one or more focus areas include at least one of an indoor air quality, a thermal comfort, or an airborne transmission; generating a performance report for the focus area based on at least the environmental parameters and specifications of the HVAC system, the performance report evaluating at least a performance of the HVAC system; and displaying the performance report on the computing device.

Technical effects of embodiments of the present disclosure include monitoring the performance of at least an HVAC system based on different focus areas at the request of an individual and then adjusting operation of the HVAC system accordingly.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
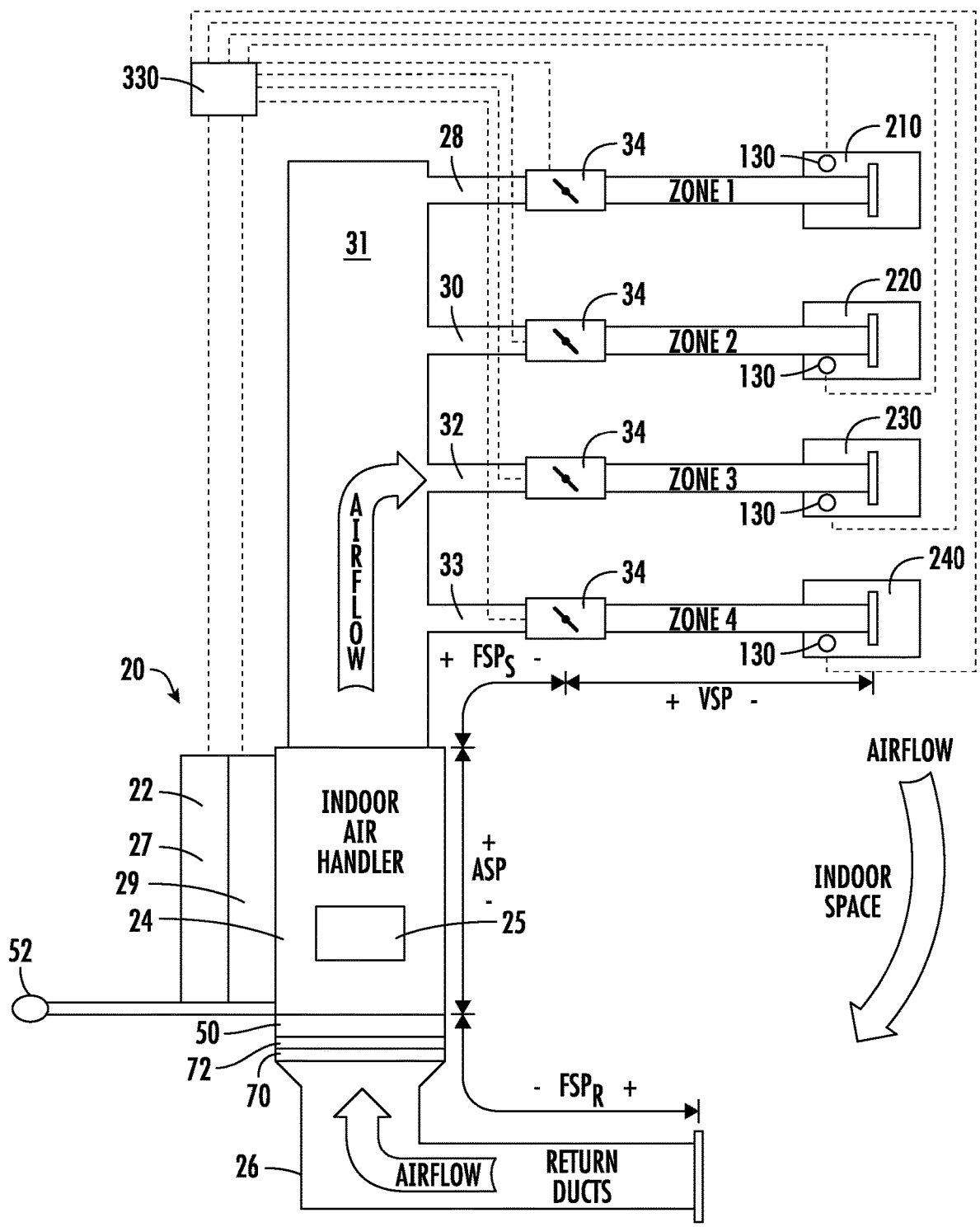
FIG. 1 is a perspective view of an exemplary heating, ventilation, and air-conditioning (HVAC) system, according to an embodiment of the present disclosure.

Referring now to FIG. 1, a heating, ventilation, and air-conditioning (HVAC) system 20 is illustrated in accordance with an embodiment of the present disclosure. It should be appreciated that the HVAC system may include any system capable of the controlling building temperature, humidity, and/or other indoor air quality (IAQ). The HVAC system 20 may be viewed as a multi-zone HVAC system including at least four zones, which may be referred to as a first zone 210, a second zone 220, a third zone 230, and a fourth zone 240. It will be appreciated that any number of zones are contemplated herein. A temperature changing component 22 for changing the condition of air, e.g., an indoor unit 29 (furnace/heater coil) and/or an outdoor unit 27 (air conditioning/heat pump), is associated with an indoor air handler 24. The air handler 24 takes air from return ducts 26 and drives the air into a plenum 31, and a plurality of supply ducts 28, 30, 32, 33 associated with distinct zones 210, 220, 230, 240 in a building. The air handler 24 includes a blower 25 (which may be fixed speed or variable speed). As shown, a damper 34 is provided on each of the supply ducts 28, 30, 32, 33.

A controller 330, such as a microprocessor control controls the dampers 34, the temperature changing component 22 (e.g., the outdoor unit 27 and the indoor unit 29), the indoor air handler 24, and also communicates with a thermostat 130 associated with each of the zones 210, 220, 230, 240. It should be appreciated that, in certain instances, these thermostats 130 may replace the typical temperature/humidity inputs and setpoints provided by multiple smart sensors (e.g., one or more temperature sensor and/or humidity sensor) that may be positioned within each zone.

The controller 330 may be an electronic controller, as discussed further herein, including a processor and an associated memory comprising computer-executable instructions (i.e., computer program product) that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The thermostat 130 allows a user to set desired temperature, noise levels, etc. for each of the zones 210, 220, 230, 240 relative to the others. Moreover, the thermostat 130 may include a temperature sensor for providing an actual temperature back to the controller 330. The thermostat 130 may be an electronic controller including a processor and an associated memory comprising computer-executable instructions (i.e., computer program product) that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

As disclosed, the controller 330 is able to receive configuring information with regard to each of these system components so that controller 330 understands individual characteristics of the elements of the HVAC system 20, which may include, but are not limited to, the temperature changing component 22 (e.g., the outdoor unit 27 and the indoor unit 29), the indoor air handler 24, the variable speed blower 25, supply ducts 28, 30, 32, 33, damper 34, and thermostat 130. Details of this feature may be as disclosed in U.S. Pat. No. 7,243,004 B2, filed on Jan. 7, 2004, and entitled "Self-Configuring Controls for Heating, Ventilating and Air Conditioning Systems." The disclosure of which is incorporated herein by reference.

In the prior art, the amount of air driven by the air handler 24 to each of the zones 210, 220, 230, 240 sometimes become excessive. Dampers 34 may be opened or closed to restrict or allow additional airflow into the zones 210, 220, 230, 240. While there are dampers 34 that are driven to either be full open or full closed, the embodiments disclosed herein may include a damper 34 having not only full open and full closed positions, but also several incrementally closed positions. In one example, there are 16 incremental positions for the damper 34 between full open and full closed. As any one of the dampers 34 is closed to reduce conditioning in that zone, additional airflow is driven to the more open of the dampers 34. This may sometimes result in too much air being delivered to one of the zones 210, 220, 230, 240, which can cause excessive temperature change, and undue noise. In the prior art, pressure responsive bypass valves may be associated with the ducting 28, 30, 32, 33 or upstream in plenum 31. The bypass of the air has undesirable characteristics, as it requires additional valves, ducting, etc., and thus complicates assembly. Typically, the bypass air is returned to the temperature changing component 22 through return duct 26. Thus, the air approaching temperature changing component 22 has already been changed away from ambient, and may be too cold or too hot for efficient operation.

For this reason, it would be desirable to find an alternative way of ensuring undue volumes of air do not flow through any of the ducts 28, 30, 32, 33 into the zones 210, 220, 230, 240. It is understood that while the figures and associated description describe four zones 210, 220, 230, 240, the embodiments disclosed herein are also applicable to HVAC systems with more or less than four zones.

The bypass air may be filtered through a filter 50 prior to returning to the temperature changing component 22. The bypass air may also be exposed to a biological management device 70 to kill various bacteria and viruses prior to returning to the temperature changing component 22. The biological management device 70 may include an ultra-violate (UV) light, ultra-violate germicidal irradiation (UVGI) light, ultra-violate photocatalytic oxidation (UVPCO) light, needle point ionization, HEPA filtration, and/or any other similar device known to one of skill in the art. Although illustrated as being down stream of the filter 50, the biological management device 70 may be located upstream of the filter 50.

The bypass air may also be exposed to an odor and chemical pollution management device 72. The odor and chemical pollution management device 72 may include at least one of a UVPCO light, carbon filters and/or any other similar device known to one of skill in the art. Although illustrated as being down stream of the biological management device 70 and the filter 50, the odor and chemical pollution management device 72 may be located upstream of the odor and chemical pollution management device 72 and/or the filter 50

The HVAC system 20 may also include an external vent 52 to pull in fresh air from outside of a building into the HVAC system 20.

Figure 2:
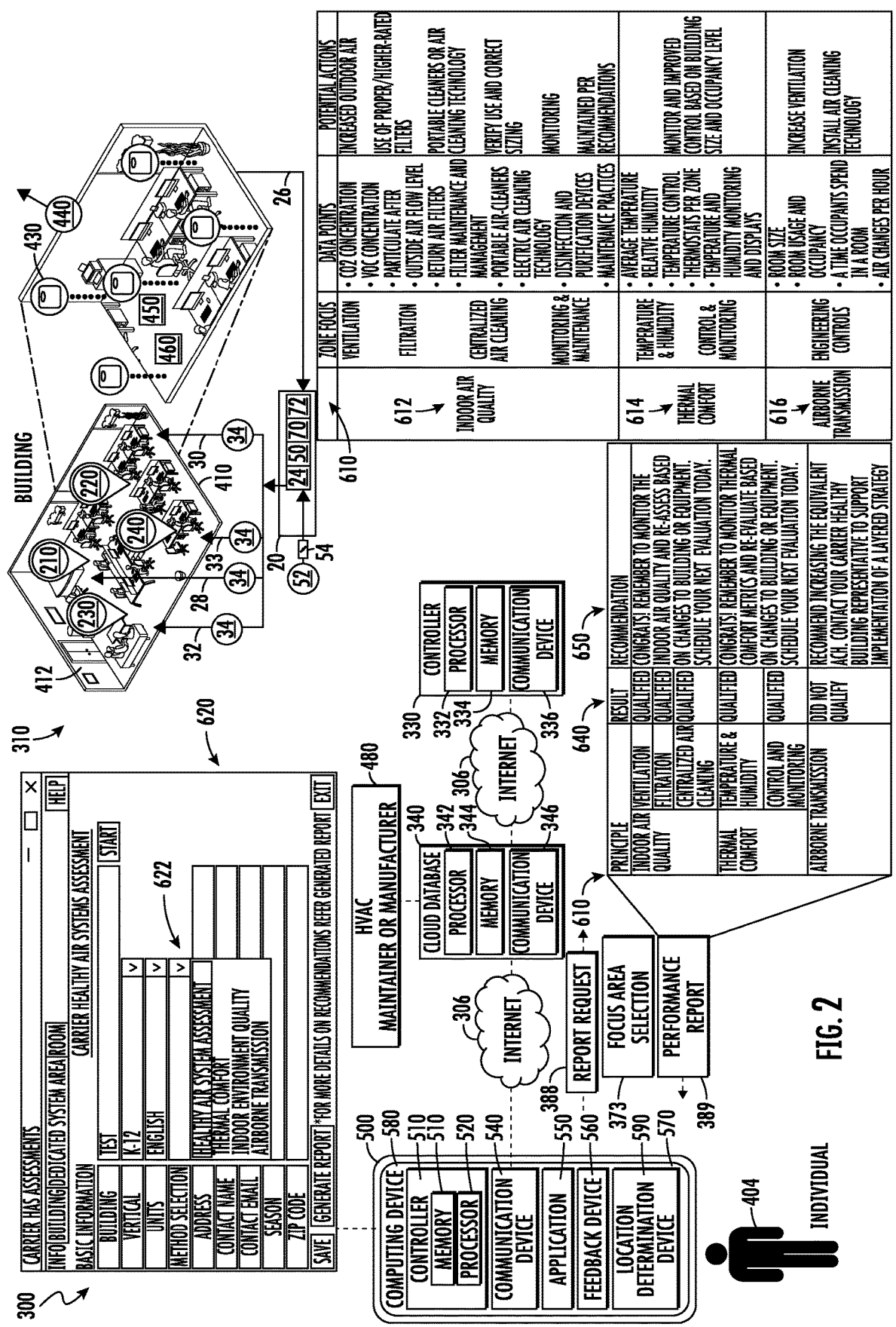
FIG. 2 is a block diagram of an exemplary environmental monitoring and control system, according to an embodiment of the present disclosure.

Referring now to FIG. 2, with continued reference to FIG. 1, a schematic diagram of an exemplary environmental monitoring and control system 300 is illustrated, according to an embodiment of the present disclosure. It should be appreciated that, although particular systems are separately defined in the schematic block diagrams, each or any of the systems may be otherwise combined or separated via hardware and/or software.

The environmental monitoring and control system 300, as illustrated, may include the cloud database 340, an environmental control system 310, and a computer application 550 installed or accessible on a computing device 500. The environmental control system 310 includes the HVAC system 20 and may also optionally include portable air-cleaners 450 and disinfection and purification devices 460 that may be distributed throughout the internal space 412 of the building 410. The portable air-cleaners 450 and disinfection and purification devices 460 may be in electronic communication with a cloud database 340 and/or a controller 330 of the HVAC system 20.

It is understood that the computer application 550 may be a mobile application installed on the computer device 500. The computer application 550 may be accessible from computing device 500, such as, for example, a software-as-as service or a website. The computer application 550 may be in communication with the cloud database via the internet 306.

The environmental control system 310 is configured to control environmental conditions within the building 410. The HVAC system 20 may work alone or in combination with the portable air-cleaners 450 and/or disinfection and purification devices 460 to control environmental conditions within the building 410.

The HVAC system 20 includes a controller 330. The controller 330 for the HVAC system 20 may be an internet of things (IoT) connected device. The building 410 may be a home, an apartment, a business, an office building, a hotel, a sports facility, a garage, a room, a shed, a boat, a plane, a bus, or any other structure known to one of skill in the art.

The controller 330 is configured to communicate with the computer application 550 and the cloud database 340. The controller 330 may be an electronic controller including a processor 332 and an associated memory 334 comprising computer-executable instructions (i.e., computer program product) that, when executed by the processor 332, cause the processor 332 to perform various operations. The processor 332 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 334 may be but is not limited to a random access memory (RAM), read only memory (ROM), or other electronic, optical, magnetic or any other computer readable medium.

The controller 330 also includes a communication device 336. The communication device 336 may be capable of wireless communication including but not limited to Wi-Fi, Bluetooth, Zigbee, Sub-GHz RF Channel, cellular, satellite, or any other wireless signal known to one of skill in the art. The communication device 336 may be configured to communicate with the cloud database 340 through the internet 306 using the communication device 336. The communication device 336 may be connected to the internet 306 through a Wi-Fi router or home automation system (not shown). Alternatively, or additionally, the communication device 336 may be configured to communicate directly with the cloud database 340.

The cloud database 340 may belong to and/or be managed by an HVAC maintainer or manufacturer 480, such as, for example a manufacturer of the HVAC system 20, a third-party service provider, or any service provider that may maintain the HVAC system 20. The HVAC maintainer or manufacturer 480 may be a person, an organization, a group, a partnership, a company, or a corporation.

In an alternate embodiment, the cloud database 340 may be distributed amongst multiple cloud databases rather than the single cloud database 340 that is illustrated in FIG. 2. In another embodiment, the cloud database 340 may be distributed across on a blockchain.

The cloud database 340 may be a remote computer server that includes a processor 342 and an associated memory 344 comprising computer-executable instructions (i.e., computer program product) that, when executed by the processor 342, cause the processor 342 to perform various operations. The processor 342 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 344 may be but is not limited to a random access memory (RAM), read only memory (ROM), or other electronic, optical, magnetic or any other computer readable medium.

The cloud database 340 also includes a communication device 346. The communication device 346 may be capable of communication with the internet. The communication device 346 may be configured to communicate with the computing device 500 through the internet 306. The communication device 346 may be a software module that handles communications to and from the computer application 550.

The computing device 500 may belong to or be in possession of an individual 404. The individual 404 may be a maintenance person, a building manager, an HVAC maintenance person, an employee or contractor of the HVAC maintainer or manufacturer 480, or any other individual that may be responsible for the environmental conditions within the building 410.

The computing device 500 may be a desktop computer, a laptop computer, or a mobile computing device that is typically carried by a person, such as, for example a phone, a smart phone, a PDA, a smart watch, a tablet, a laptop, or any other mobile computing device known to one of skill in the art.

The computing device 500 includes a controller 510 configured to control operations of the computing device 500. The controller 510 may be an electronic controller including a processor 530 and an associated memory 520 comprising computer-executable instructions (i.e., computer program product) that, when executed by the processor 530, cause the processor 530 to perform various operations. The processor 530 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 520 may be but is not limited to a random access memory (RAM), read only memory (ROM), or other electronic, optical, magnetic or any other computer readable medium.

The computing device 500 includes a communication device 540 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the computing device 500 may be connected to the internet 306 through a hardwired connection. The computing device 500 is configured to communicate with the cloud database 340 through the internet 306.

The computing device 500 may include a display device 580, such as for example a computer display, an LCD display, an LED display, an OLED display, a touchscreen of a smart phone, tablet, or any other similar display device known to one of the skill in the art. The individual 404 operating the computing device 500 is able to view the computer application 550 through the display device 580.

The computing device 500 includes an input device 570 configured to receive a manual input from a user (e.g., human being) of computing device 500. The input device 570 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the computing device 500, or any similar input device known to one of skill in the art. The user operating the computing device 500 is able to enter data into the computer application 550 through the input device 570. The input device 570 allows the user operating the computing device 500 to data into the computer application 550 via a manual input to input device 570. For example, the user may respond to a prompt on the display device 580 by entering a manual input via the input device 570. In one example, the manual input may be a touch on the touchscreen. In an embodiment, the display device 580 and the input device 570 may be combined into a single device, such as, for example, a touchscreen.

The computing device 500 device may also include a feedback device 560. The feedback device 560 may activate in response to a manual input via the input device 570. The feedback device 560 may be a haptic feedback vibration device and/or a speaker emitting a sound. The feedback device 560 may activate to confirm that the manual input entered via the input device 570 was received via the computer application 550. For example, the feedback device 560 may activate by emitting an audible sound or vibrate the computing device 500 to confirm that the manual input entered via the input device 570 was received via the computer application 550.

The computing device 500 may also include a location determination device 590 that may be configured to determine a location of the computing device 500 using cellular signal triangulation, a global position satellite (GPS), or any location termination method known to one of skill in the art.

The HVAC system 20 is configured to control environmental conditions within the building 410. The HVAC system 200 may provide conditioned air to the internal space 412 of the building 410. The conditioned air may be heated or cooled air by the HVAC system 200. The HVAC system 200 may also filter the air provided to the internal space 412 of the building 410 using a filter 50. As aforementioned, the HVAC system 200 may be configured to provide conditioned air to different zones 210, 220, 230, 240 of the building 410. The amount of conditioned air provided to each zone 210, 220, 230, 240 may be adjusted using one or more dampers 34. It is understood, while the zones 210, 220, 230, 240 are illustrated in the same room on the same floor of the building 410, the embodiments disclosed herein are also applicable to zones being located in different rooms and/or on different floors.

The air may be removed from the internal space 412 of the building 410 and returned to the air handler 24 through a return duct 26. The HVAC system 20 may also include a vent fan 440 configured to remove air the internal space 412 of the building 410 and vent the air to an area outside of the building 410. The HVAC system 20 may use the return duct 26 and/or the vent fan 440 to remove air from the internal space 412 and may then replace the air in the internal space 412 with fresh air or filtered air from the air handler 24 through supply ducts 28, 30, 32, 33. The fresh air may be pulled into the air handler 24 through an external vent 52 that is fluidly connected to an area outside of the building 410. The filtered air may be air that has been recovered from the internal space 412 through the return duct and filtered by the filter 50 of the HVAC system 20.

The environmental monitoring and control system 300 may include sensors 430 located in each zone 210, 220, 330, 240. The sensors 430 are configured to monitor environmental parameters throughout the building 410 and the HVAC system 20.

The environmental monitoring and control system 300 includes three potential focus areas 610 includes indoor air quality 612, thermal comfort 614, and/or airborne transmission 616.

The environmental monitoring and control system 300 is configured adjust operation of the HVAC system 20 to focus on indoor air quality 612, thermal comfort 614, and/or airborne transmission 616 based on environmental parameters and specifications of the HVAC system 20. The environmental monitoring system environmental monitoring and control system 300 is configured to adjust its focus between indoor air quality 612, thermal comfort 614, and/or airborne transmission 616 based on input received from the individual through the computer application 550 using the computing device 500

The environmental monitoring and control system 300 is configured adjust operation of the HVAC system 20 to focus on achieving a performance score for indoor air quality 612, thermal comfort 614, and/or airborne transmission 616 based on environmental parameters and specifications of the HVAC system 20. The performance score may depict how successful the HVAC system 20 is at maintaining indoor air quality 612, thermal comfort 614, and/or airborne transmission 616. For example, a high performance score may mean that the HVAC system 20 is successfully maintaining indoor air quality 612, thermal comfort 614, and/or airborne transmission 616. Whereas a low performance score may mean that the HVAC system 20 is not successfully maintaining indoor air quality 612, thermal comfort 614, and/or airborne transmission 616. The HVAC system 20 may be programed to maintain the performance score above a threshold performance score for each of indoor air quality 612, thermal comfort 614, and/or airborne transmission 616. Any performance score below the threshold performance score may prompt the HVAC system 20 to make adjustments in operation and/or transmit instructions to the individual 404 via the computing device 500 to adjust the operation of the HVAC system 20.

The performance scores may be determined locally by the controller 330 of the HVAC system 20 and/or remotely by the cloud database 340.

The focus on indoor air quality 612 may focus on ventilation, filtration, centralized, air cleaning, monitoring and/or maintenance of the HVAC system 20 and associated components (e.g., the portable air-cleaner 450 and the disinfection and purification device 460). The controller 330 and/or the cloud database 340 may be configured to determine a performance score for the indoor air quality 612 based on environmental parameters detected by the sensors 430 and specifications of the HVAC system 20. The environmental parameters used in the determination of a performance score for indoor air quality 612 may include, but are not limited to, carbon dioxide concentration ($CO_2$), volatile organic compounds (VOC), particulate matter, and outside air flow level.

The outside air flow level is the volumetric flow rate of air from outside the building 410 is pulled into the building 410 by the HVAC system 20 via an external vent 52. The outside air flow level is a position on a lever that controls an open percentage of an outside air damper 54. The outside air damper 52 is a part of the HVAC system 20 that acts to throttle the volumetric flow rate by being held at an open percentage. That open percentage can be from 0-100%, with most of the time being spent between 20%-60%. The damper position of the outside air damper 52 can be held fixed/static or controlled dynamically by an actuator and tied to a control system.

As aforementioned, these environmental parameters may be actively detected by the sensors 430 in real-time and reported to the controller 330. The specifications of the HVAC system 20 used in the determination of a performance score for indoor air quality 612 may include, but are not limited to, an outdoor air quality, return air filters 50, filter maintenance and management details, portable air-cleaner details 450, electronic air cleaning technology (e.g., the biological management device 70, the odor and chemical pollution management device 72), disinfection and purification devices 460, and maintenance practices for the HVAC system and associated components. The specifications of the HVAC system 20 may be stored in the controller 330, the cloud database 340, or another database electronically connected to at least one of the controller 330 or the cloud database 340.

If the performance score for the indoor air quality 612 is below a performance score threshold then the operation of the HVAC system 20 may be adjusted in order to bring the performance score for the indoor air quality 612 back above the performance score threshold. It will be appreciated that the HVAC system 20 may be configured to automatically make the adjustments (e.g., without human intervention). Adjustments to the HVAC system 20 may include increasing outdoor air flow into the internal space 412 through the external vent 52, increasing a detection frequency of the sensors 430, activating or adjusting additional portable air-cleaners 450 and disinfection and purification devices 460, verify use and correct sizing, adjustment or changing of filter 50, adjustment of a speed of the variable speed blower 25, adjustment or activation of a damper 34, adjustment or activation of the biological management device 70, adjustment or activation of the odor and chemical pollution management device 72, and transmission of instructions to the individual via the computer application 550 to perform a maintenance action. Regarding "verify use and correct sizing", the devices are being used in the HVAC system 20 may need their size verified to ensure that they are the appropriate size for the HVAC system 20 and their use in the HVAC system 20 may need to be verified as appropriate (e.g., powered on, installed per manufacturer guidance, and do not appear damaged) to provide the expected level of clean air.

The filter 50 may be adjusted or changed by the HVAC system 20 automatically to replace with a new filter or replace with a filter of a different filtration size. Different filtration sizes of filters may be required to filter out particulates of different sizes.

The focus on thermal comfort 614 may focus on temperature, humidity, control and/or monitoring of the HVAC system 20 and associated components (e.g., portable air-cleaner details 450 and disinfection and purification devices 460). The controller 330 and/or the cloud database 340 may be configured to determine a performance score for the thermal comfort 614 based on environmental parameters detected by the sensors 430 and specifications of the HVAC system 20. The environmental parameters used in the determination of a performance score for thermal comfort 614 may include, but are not limited to, average temperature, relative humidity, and temperature control. As aforementioned, these environmental parameters may be actively detected by the sensors 430 in real-time and reported to the controller 330. The specifications of the HVAC system 20 used in the determination of a performance score for thermal comfort 614 may include, but are not limited to, the number of thermostats per zone, at least one temperature sensor connected to an interface that provides input to HVAC system 20, and at least one temperature and humidity sensor connected to a display. The specifications of the HVAC system 20 may be stored in the controller 330, the cloud database 340, or another database electronically connected to at least one of the controller 330 or the cloud database 340.

If the performance score for the thermal comfort 614 is below a performance score threshold then the operation of the HVAC system 20 may be adjusted in order to bring the performance score for the thermal comfort 614 back above the performance score threshold. Adjustments to the HVAC system 20 may include monitoring and improved control based on building size and occupancy level. The HVAC system 20 may use occupancy as a metric for ventilation requirements. For example, 22 cfm/person may be a threshold for a healthy air system then the occupancy is monitored by a sensor and the number of people in the room or building 410 is sent to the HVAC system 20. The HVAC system 20 may then adjust the air flow level via damper 34 position to allow more or less outdoor air inside. This maintains the performance score.

The focus on airborne transmission 616 may focus on engineering controls of the HVAC system 20 and associated components (e.g., portable air-cleaner details 450 and disinfection and purification devices 460). The engineering controls may be upgrades to facilities that reduce risk, vs. administrative controls that are implemented as rules (e.g., work from home and/or social distancing), or design controls that eliminate (or at least mitigate) the risk by eliminating (or at least reducing) the source (e.g., vaccinations and testing). Engineering controls are methods and equipment that improve upon the facility/home or building 410 to address a particular risk. The controller 330 and/or the cloud database 340 may be configured to determine a performance score for the airborne transmission 616 based on environmental parameters detected by the sensors 430 and specifications of the HVAC system 20. The environmental parameters used in the determination of a performance score for airborne transmission 616 may include, but are not limited to, a room occupancy (e.g., a number of people), a time occupants spend in a room, a building occupancy, and air change rate in the internal space (e.g., how much air is circulated into and out of each zone 210, 220, 230, 240). The air change rate includes outdoor air from the external vent 52 and filtered air from the return duct 26. As aforementioned, these environmental parameters may be actively detected by the sensors 430 in real-time and reported to the controller 330. The specifications of the HVAC system 20 used in the determination of a performance score for airborne transmission 616 may include, but are not limited to, a room size, a room usage, a building size, and a building usage. The specifications of the HVAC system 20 may be stored in the controller 330, the cloud database 340, or another database electronically connected to at least one of the controller 330 or the cloud database 340.

If the performance score for the airborne transmission 616 is below a performance score threshold then the operation of the HVAC system 20 may be adjusted in order to bring the performance score for the airborne transmission 616 back above the performance score threshold. Adjustments to the HVAC system 20 may include increasing ventilation by adjusting the vent fan 440 and transmission of instructions to the individual 404 via the computer application 550 to install air cleaning technology. For example, the recommendation may be to install new equipment to improve the performance score for airborne transmission. New equipment that may be recommended may include but are not limited to MERV 13 filters, HEPA filtration, in room air purifiers, UV lights, ionizers, UVPCO lights, energy recovery ventilation, heat recovery ventilation, a dedicated outdoor air system, powered exhaust and economizers, or any other airborne transmission reduction device known to one of skill in the art.

If the individual 404 desires to see how the HVAC system 20 is performing, the individual 404 may submit a report request 388 to the cloud database 340 to obtain a performance report 389 on the HVAC system 20 through the computer application 550. The individual 404 may select through the computer application 550 whether they want the performance report 389 to focus on indoor air quality 612, thermal comfort 614, and/or airborne transmission 616. The individual 404 may selected their desired focus area 610 through a manual input via a user input device 570 of the computing device wall in the computer application 550. For example, the options of focus areas 610 may be displayed as drop down selection menu 622 in a graphical user interface 620 of the computer application 550. The focus area selection 373 and report request 388 is transmitted to the cloud database 340 and at least of one of the cloud database 340 and the controller 330 will compile a performance report 389 in response to the report request 388 and the focus area selection 373.

The performance report 389 may evaluate the operational performance of the environmental control system 310 based on the focus area 610. The performance report 389 may evaluate the operational performance of at least the HVAC system 20, but may also evaluate the operational performance of the portable air-cleaners 450 and disinfection and purification devices 460 if present.

The performance report 389 may include a result 640 of analyzing the HVAC system 20 based on each focus area 610. The result 640 may simply state whether the HVAC system 20 "passed" in the focus area 610 or "did not qualify" in the focus area 610. The HVAC system 20 would have "passed" in the focus area 610 if the performance score in the focus area 610 was greater than the threshold performance score in the focus area 610. The HVAC system 20 "did not qualify" in the focus area 610 if the performance score in the focus area 610 was less than the threshold performance score in the focus area 610. The performance report 389 would also include a recommendation 650 on how to maintain or improve the result 640.

Figure 3:
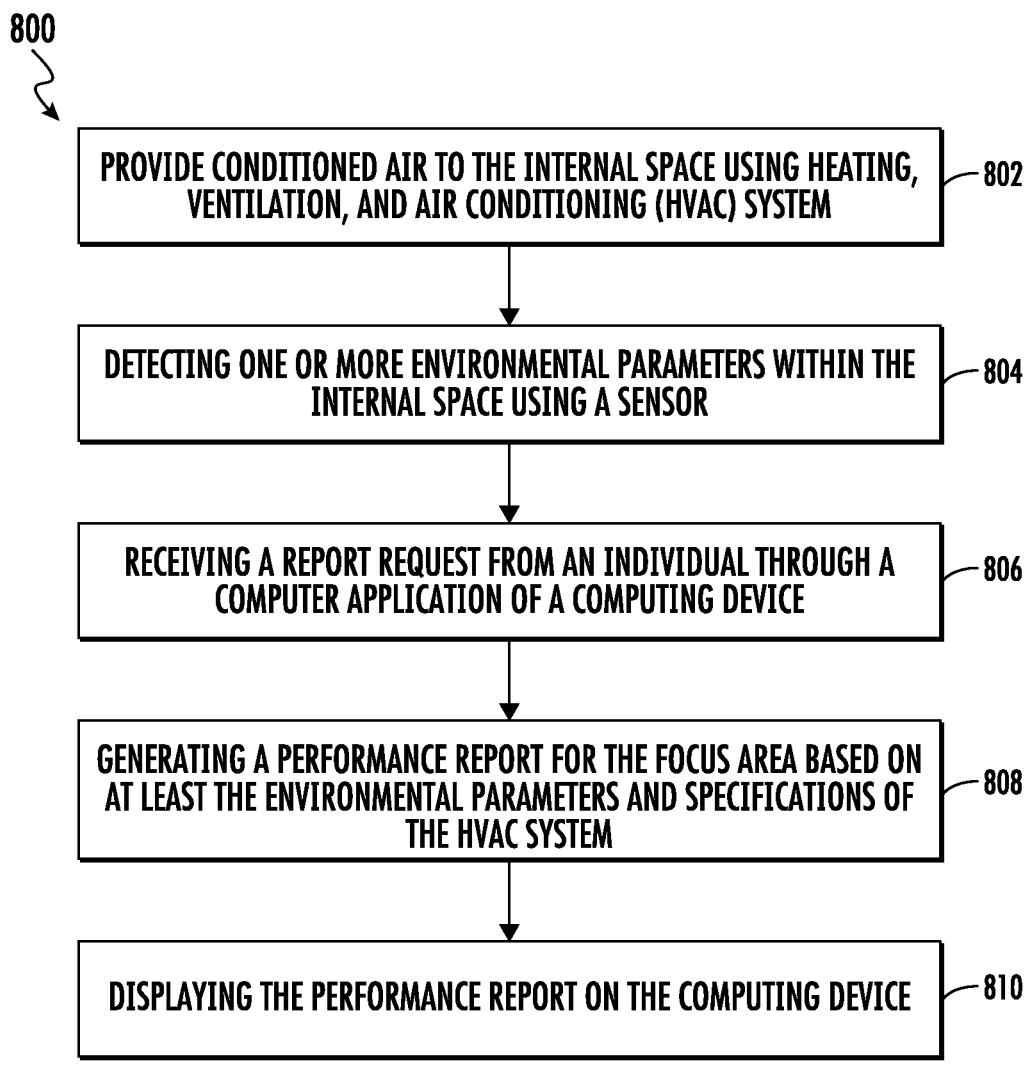
FIG. 3 is a flow diagram illustrating an exemplary method for monitoring and controlling an environment of an internal space, according to an embodiment of the present disclosure.

Referring now to FIG. 3, with continued reference to FIGS. 1-2, a flow diagram illustrating an exemplary computer implemented method 800 for monitoring and controlling an environment of an internal space 412 is illustrated in accordance with an embodiment of the present disclosure. In embodiment, the computer implemented method 800 is performed by the environmental monitoring and control system 300.

At block 802, conditioned air is provided to the internal space 412 using an HVAC system 20. At block 804, one or more environmental parameters are detected within the internal space 412 using a sensor 430. At block 806, a report request 388 is received from an individual 404 through a computer application 550 of a computing device 500. The report request 388 includes a focus area 610 selection that selects one or more focus areas 610. The one or more focus areas 610 include at least one of an indoor air quality 612, a thermal comfort 614, or an airborne transmission 616.

At block 808, a performance report 389 is generated for the focus area 610 based on at least the environmental parameters and specifications of the HVAC system 20. The performance report 389 evaluating at least a performance of the HVAC system 20. At block 810, the performance report 389 is displayed on the computing device 500.

In addition to the HVAC system 20, the method 800 may also include that air within the internal space 412 is cleaned using one or more portable air-cleaners 450. The performance report 389 may evaluate at least a performance of the HVAC system 20 and a performance of the one or more portable air-cleaners 450.

In addition to the HVAC system 20, the method 800 may also include that air within the internal space 412 is disinfected using one or more disinfection and purification devices 460. The performance report 389 may evaluate at least a performance of the HVAC system 20 and a performance of the one or more disinfection and purification devices 460.

In block 808 the generation of the performance report 389 for the focus area 610 may further include: determining a performance score for each of the one or more focus areas 610 based on at least the environmental parameters and specifications of the HVAC system 20, comparing the performance score to a threshold performance score, and adjusting the HVAC system 20 if the performance score is below the threshold performance score.

The HVAC system 20 may be adjusted by increasing outdoor air flow into the internal space 412 through an external vent 52. The HVAC system 20 may be adjusted by increasing a detection frequency of the sensor 430. The HVAC system 20 may be adjusted by activating or adjusting portable air-cleaners 450. The HVAC system 20 may be adjusted by activating or adjusting disinfection and purification devices 460. The HVAC system 20 may be adjusted by adjusting or changing a filter 50 of the HVAC system 20. The HVAC system 20 may be adjusted by adjusting or changing a filter 50 of the HVAC system 20. The HVAC system 20 may be adjusted by adjusting or activating a damper 34 of the HVAC system 20. The HVAC system 20 may be adjusted by adjusting or changing a filter 50 of the HVAC system 20. The HVAC system 20 may be adjusted by adjusting or activating a biological management device 70 of the HVAC system 20. The HVAC system 20 may be adjusted by adjusting or activating an odor and chemical pollution management device 72

In block 808 the generation of the performance report 389 for the focus area 610 may further include: determining a performance score for each of the one or more focus areas 610 based on at least the environmental parameters and specifications of the HVAC system 20, comparing the performance score to a threshold performance score, and transmitting instructions to the individual 404 via the computer application 550 to perform a maintenance action if the performance score is below the threshold performance score.

The generation of the performance report 389 for the focus area 610 may further include determining a performance score for indoor air quality 612 based on at least the environmental parameters and specifications of the HVAC system 20. The environmental parameters may include at least one of carbon dioxide concentration (CO2), volatile organic compounds (VOC), particulate matter, and outside air flow level. The specifications of the HVAC system 20 may include at least one of a type of outdoor air and return air filters, filter maintenance and management details, portable air-cleaner details, air cleaning technology, disinfection and purification devices 460, and maintenance practices for the HVAC system 20 and associated components.

The generation of the performance report 389 for the focus area 610 may further include determining a performance score for thermal comfort 614 based on at least the environmental parameters and specifications of the HVAC system 20. The environmental parameters may include at least one of average temperature, relative humidity, and temperature control. The specifications of the HVAC system 20 may include at least one of a number of thermostats per zone, a temperature control, and a temperature and humidity monitoring and displays.

The generation of the performance report 389 for the focus area 610 may further include determining a performance score for airborne transmission 616 based on at least the environmental parameters and specifications of the HVAC system 20. The environmental parameters may include at least one of a room occupancy, a building occupancy, and air change rate in the internal space 412. The specifications of the HVAC system 20 include at least one of a room size, a room usage, a building size, and a building usage.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for monitoring and controlling an environment of an internal space, the method comprising:
providing conditioned air to the internal space using a heating, ventilation, and air conditioning (HVAC) system;
detecting one or more environmental parameters within the internal space using at least one sensor;
receiving a report request from an individual through a computer application of a computing device, the report request including a focus area selection that selects one or more focus areas, wherein the one or more focus areas include at least one of an indoor air quality, a thermal comfort, or an airborne transmission;
generating a performance report for the focus area based on at least the environmental parameters and specifications of the HVAC system, the performance report evaluating at least a performance of the HVAC system; and
displaying the performance report on the computing device;
wherein generating the performance report for the focus area further comprises:
determining a performance score for each of the one or more focus areas based on at least the environmental parameters and the specifications of the HVAC system, wherein the performance score indicates how successful the HVAC system is at maintaining indoor air quality, thermal comfort and airborne transmission;
comparing the performance score to a threshold performance score; and
adjusting the HVAC system if the performance score is below the threshold performance score.

2. The method of claim 1, further comprising:
cleaning air within the internal space using one or more portable air-cleaners,
wherein the performance report evaluates at least a performance of the HVAC system and a performance of the one or more portable air-cleaners.

3. The method of claim 1, further comprising:
disinfecting air within the internal space using one or more disinfection and purification devices,
wherein the performance report evaluates at least a performance of the HVAC system and a performance of the one or more disinfection and purification devices.

4. The method of claim 1, wherein adjusting the HVAC system comprises:
increasing outdoor air flow into the internal space through an external vent.

5. The method of claim 1, wherein adjusting the HVAC system comprises:
increasing a detection frequency of the at least one sensor.

6. The method of claim 1, wherein adjusting the HVAC system comprises:
activating or adjusting portable air-cleaners.

7. The method of claim 1, wherein adjusting the HVAC system comprises:
activating or adjusting disinfection and purification devices.

8. The method of claim 1, wherein adjusting the HVAC system comprises:
adjusting or changing a filter of the HVAC system.

9. The method of claim 1, wherein adjusting the HVAC system comprises:
adjusting or activating a damper of the HVAC system.

10. The method of claim 1, wherein adjusting the HVAC system comprises:
adjusting or activating a biological management device of the HVAC system.

11. The method of claim 1, wherein adjusting the HVAC system comprises:
adjusting or activating an odor and chemical pollution management device of the HVAC system.

12. The method of claim 1, wherein generating the performance report for the focus area further comprises:
transmitting instructions to the individual via the computer application to perform a maintenance action if the performance score is below the threshold performance score.

13. The method of claim 1, wherein generating the performance report for the focus area further comprises:
determining a performance score for indoor air quality based on at least the environmental parameters and the specifications of the HVAC system,
wherein the environmental parameters include at least one of carbon dioxide concentration ($CO_2$), volatile organic compounds (VOC), particulate matter, and outside air flow level, and
wherein the specifications of the HVAC system include at least one of a type of outdoor air and return air filters, filter maintenance and management details, portable air-cleaner details, air cleaning technology, disinfection and purification devices, and maintenance practices for the HVAC system and associated components.

14. The method of claim 1, wherein generating a performance report for the focus area further comprises:
determining a performance score for thermal comfort based on at least the environmental parameters and the specifications of the HVAC system,
wherein the environmental parameters include at least one of average temperature, relative humidity, and temperature control, and
wherein the specifications of the HVAC system include at least one of a number of thermostats per zone, a temperature control, and temperature and humidity monitoring and displays.

15. The method of claim 1, wherein generating the performance report for the focus area further comprises:
determining a performance score for airborne transmission based on at least the environmental parameters and the specifications of the HVAC system,
wherein the environmental parameters include at least one of a room occupancy, a building occupancy, and air change rate in the internal space, and
wherein the specifications of the HVAC system include at least one of a room size, a room usage, a building size, and a building usage.

16. An environmental monitoring and control system for monitoring and controlling an environment of an internal space, the environmental monitoring and control system comprising:
a processor; and
a memory comprising computer-executable instructions that, when executed by the processor, cause the processor to perform operations, the operations comprising:
providing conditioned air to the internal space using a heating, ventilation, and air conditioning (HVAC) system;
detecting one or more environmental parameters within the internal space using at least one sensor;
receiving a report request from an individual through a computer application of a computing device, the report request including a focus area selection that selects one or more focus areas, wherein the one or more focus areas include at least one of an indoor air quality, a thermal comfort, or an airborne transmission;
generating a performance report for the focus area based on at least the environmental parameters and specifications of the HVAC system, the performance report evaluating at least a performance of the HVAC system; and
displaying the performance report on the computing device;
wherein generating the performance report for the focus area further comprises:
determining a performance score for each of the one or more focus areas based on at least the environmental parameters and the specifications of the HVAC system, wherein the performance score indicates how successful the HVAC system is at maintaining indoor air quality, thermal comfort and airborne transmission;
comparing the performance score to a threshold performance score; and
adjusting the HVAC system if the performance score is below the threshold performance score.

17. A computer program product tangibly embodied on a non-transitory computer readable medium, the computer program product including instructions that, when executed by a processor, cause the processor to perform operations comprising:
providing conditioned air to the internal space using a heating, ventilation, and air conditioning (HVAC) system;
detecting one or more environmental parameters within the internal space using at least one sensor;
receiving a report request from an individual through a computer application of a computing device, the report request including a focus area selection that selects one or more focus areas, wherein the one or more focus areas include at least one of an indoor air quality, a thermal comfort, or an airborne transmission;
generating a performance report for the focus area based on at least the environmental parameters and specifications of the HVAC system, the performance report evaluating at least a performance of the HVAC system; and
displaying the performance report on the computing device;
wherein generating the performance report for the focus area further comprises:
determining a performance score for each of the one or more focus areas based on at least the environmental parameters and the specifications of the HVAC system, wherein the performance score indicates how successful the HVAC system is at maintaining indoor air quality, thermal comfort and airborne transmission;
comparing the performance score to a threshold performance score; and
adjusting the HVAC system if the performance score is below the threshold performance score.

* * * * *